United States Patent [19]

Seki et al.

[11] 3,951,632

[45] Apr. 20, 1976

[54] METHOD FOR MANUFACTURE OF FOAM GLASS

[75] Inventors: Yachio Seki, Ikeda; Masaya Nakamura, Suita, both of Japan

[73] Assignee: Agency of Industrial Science and Technology, Tokyo, Japan

[22] Filed: Nov. 14, 1974

[21] Appl. No.: 523,726

[30] Foreign Application Priority Data

Nov. 20, 1973 Japan.............................. 48-130898

[52] U.S. Cl........................................ 65/22; 65/20; 106/40 V
[51] Int. Cl.² ......................................... C03B 19/08
[58] Field of Search .................. 65/20, 22; 106/40 V

[56] References Cited
UNITED STATES PATENTS 3,150,988    9/1964    Dess et al. ..................... 106/40 V
3,459,565    8/1969    Jones et al. ............................ 65/22

*Primary Examiner*—Arthur D. Kellogg
*Attorney, Agent, or Firm*—Oblon, Fisher, Spivak, McClelland & Maier

[57] ABSTRACT

A foam glass is manufactured by mixing silicate glass, a volcanic glass material (volcanic ashes of a special chemical composition, occurring in the Kyushu District of Japan), water glass and at least one member selected from the group consisting of sodium salts and calcium salts of phosphoric acid, firing the resultant mixture into a fused state and cooling the fused mixture. The foam glass has a high aluminum content, contains numerous fine bubbles less than 1.5mm in diameter, has a bulk density of less than 1 and shows excellent mechanical strength such as, for example, high bending strength.

4 Claims, 1 Drawing Figure

U.S. Patent   April 20, 1976   3,951,632
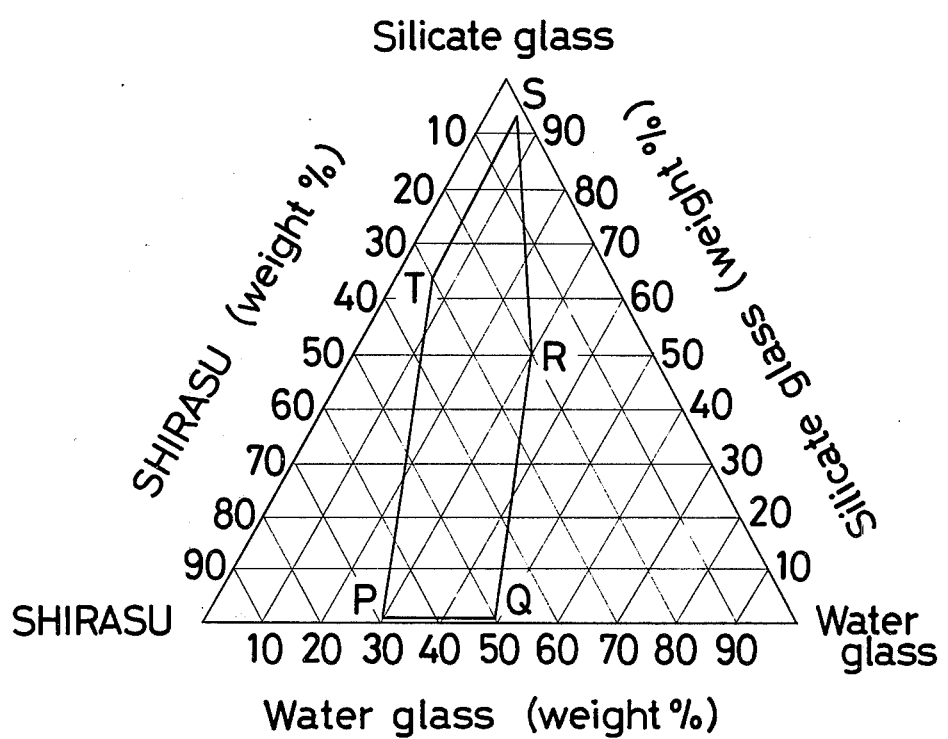

METHOD FOR MANUFACTURE OF FOAM GLASS

BACKGROUND OF THE INVENTION

This invention relates to a method for the manufacture of foam glass having high mechanical strength and a bulk density of less than 1 and to the foam glass manufactured by the said method.

Generally, foam glass has a low specific gravity, exhibits a heat insulating effect and enjoys a decorative value and, therefore, finds utility in interior and exterior decoration of buildings, for example.

Of the methods heretofore known for the manufacture of foam glass, typical are those to be described below. It has been known to obtain from glass by adding to glass a foaming agent such as carbon or calcium carbonate. This method attaches special emphasis to the decrease of bulk density. Consequently, it entails a disadvantage that the product shows a very low bending strength as of the order of 5 kg/cm$^2$ and is heavily limited in utility. There is another disadvantage that because of its black color, the foam glass is not suitable for use in interior decoration which particularly attracts attention. Further, with this method it is difficult to manufacture foam glass of a small thickness. It has been customary, therefore, to obtain thin sheets of foam glass by first producing a thick plate of foam glass by the method under discussion and subsequently splitting the thick foam glass into several sheets having a desired small thickness. This naturally results in an increased cost of production.

A method whereby a foamed rigid product of calcium silicate-water glass system is manufactured has also been known. This product is not practical because of its inferior water-resistance.

There has also been known a method which utilizes for inclusion of bubbles in glass the phenomenon of gas generation during the decomposition of Glauber's salt. This method, however, has a possibility of causing environmental pollution.

In the circumstances, researches have been pursued after a process which is capable of manufacturing a novel foam glass using a glass-SHIRASU-water glass system. In this system, however, there is entailed a disadvantage that the range of composition in which the produced foam glass has a small bubble diameter and a small bulk density is quite limited.

An object of this invention is to provide a method for the manufacture of foam glass of the type having a small bulk density and excellent mechanical strength.

Another object of this invention is to provide a method for the manufacture of foam glass, which method is simple to carry out and does not entail formation of any noxious substance in the course of manufacture of foam glass.

Still another object of this invention is to provide a method for the manufacture of foam glass which is suitable for use as interior and exterior decorative materials for building.

SUMMARY OF THE INVENTION

To attain the objects described above according to the present invention there is provided a method for the manufacture of a foam glass, which method comprises mixing silicate glass, a volcanic glass material typified by SHIRASU (which is a whitish volcanic ash sand occurring abundantly in the Kyushu District of Japan, having as its principal component, volcanic glass and also containing crystals such as of feldspar, having a typical chemical composition of 70.0% $SiO_2$, 13.4% $Al_2O_3$, 2.4% NaO, 2.7%, $K_2O$, 3.0% CaO and 1.3% $Fe_2O_3$ by weight, and possessing properties of 6.1 in ignition loss, 2.4 – 1.8 in specific gravity and 1200°C in softening point), water glass and a sodium salt or a calcium salt of phosphoric acid, converting the resultant mixture into a slurry by addition of water, molding the slurry in a desired form, firing the molded mixture into a fused state and cooling the fused mixture. To be more specific, two processes are available for the manufacture of foam glass from the said slurry according to this invention: They are a process which comprises the steps of drying the slurry and pulverizing the dried slurry into a powder, molding this powder, heating and firing the mold into a fused state and cooling the fused mold and a process which comprises the steps of casting the slurry in a mold, then drying the mold, heating and firing the dried mold into a fused state and subsequently cooling the fused mold.

The foam glass to be manufactured by this method suffers a very small increase in the diameter of bubbles in the course of manufacture. Thus the product contains bubbles not more than about 1.5mm in diameter and, therefore, enjoys high mechanical strength. Its chemical composition is 72.2 to 74.7% of $SiO_2$, 2.6 to 9.8% $Al_2O_3$, 9.3 to 14.9% $Na_2O$, 1.5 to 2.2% $K_2O$, about 0.6% $Fe_2O_3$, 0.1 to 6.5% CaO and 0 to 1.9% MgO by weight. The product enjoys a beautiful appearance.

Other characteristics and other benefits of the present invention will become apparent from the description to be given herein below with reference to the accompanying drawing.

BRIEF EXPLANATION OF THE DRAWING

FIG. 1 is a ternary diagram showing the mixing ratio of silicate glass, SHIRASU and water glass as the raw materials used in the manufacture of foam glass according to this invention.

DETAILED DESCRIPTION OF THE INVENTION

This invention aims to produce foam glass by a method which comprises mixing the three components of silicate glass, a volcanic glass material typified by SHIRASU and water glass with a sodium salt or a calcium salt of phosphoric acid, converting the resultant mixture into a slurry by addition of water, molding this slurry in a desired form, firing the molded mixture into a fused state and cooling the fused mixture. More specifically, the method for manufacturing the foam glass from the slurry according to this invention embraces two alternative processes; a process which comprises the steps of drying and pulverizing the slurry into a powder, molding this powder, heating and firing the molded powder into a fused state and subsequently cooling the fused mold and a process which comprises the steps of casting the slurry in a mold, then drying the mold, heating and firing the mold into a fused state and subsequently cooling the fused mold.

The silicate glass described above as one component of the raw material is not specifically limited in terms of type. Ordinary glass powder, glass cullet and even glass debris can be used as silicate glass.

SHIRASU, typical of volcanic glass material has an average composition of 70.0% $SiO_2$, 13.4% $Al_2O_3$, 2.4% $Na_2O$, 2.7% $K_2O$, 3.0% CaO, 1.3% $Fe_2O_3$ and 6.1% ignition loss. It occurs abundantly in the Kyushu District of Japan. As to its chemical and physical properties, SHIRASU is a whitish volcanic ash sand composed preponderantly of volcanic glass and also containing crystals such as of feldspar. It has a particle size of from 2 to 0.05mm, a specific gravity of 2.4 to 1.8 and a melting point of 1200°C. The water glass may be in the form of aqueous solution or anhydride.

This invention is characterized by its requirement for addition of sodium salt or calcium salt of phosphoric acid to the aforementioned three components.

For the purpose of this addition, it is particularly desirable to use dibasic sodium phosphate as a sodium salt of phosphoric acid and to use dibasic calcium phosphate as a calcium salt of phosphoric acid. Now, a description will be given of the mixing ratio of the components in the raw material. The mixing ratio of the components has some bearing upon the temperature of firing to be described afterward. Where the firing is made at temperatures of 850° – 950°C, however, the mixing ratio of silicate glass, SHIRASU and water glass is desired to fall within the range of the accompanying termary diagram which is enclosed with the straight lines drawn to connect the point P (1 percent by weight of silicate glass, 30 percent by weight of water glass and 69 percent by weight of SHIRASU), the point T (65 percent by weight of silicate glass, 5 percent by weight of water glass and 30 percent by weight of SHIRASU), the point S (93 percent by weight of silicate glass, 5 percent by weight of water glass and 2 percent by weight of SHIRASU), the point R (50 percent by weight of silicate glass, 30 percent by weight of water glass and 20 percent by weight of SHIRASU) and the point Q (1 percent by weight of silicate glass, 49 percent by weight of water glass and 50 percent by weight of SHIRASU) successively in the order mentioned. If the water glass content exceeds the lines of S-R-Q in the ternary diagram, the bubbles gain in diameter and the bulk density increases. If the water glass content does not exceed the lines S-T-P, however, the bubbles lose in diameter and the bulk density increases. Thus, any water glass content outside the defined range is not desirable from the practical point of view.

Where the heating is given at 850° — 950°C, it is desired to use a raw material in which the components are mixed at a ratio falling inside the defined range. If the heating is given at a higher temperature, the mixing ratio required for obtaining foam glass of excellent properties tends to gain in the SHIRASU fraction, namely, to shift toward the right in the ternary diagram.

As pertains to the salt of phosphoric acid, if a sodium salt is selected, it is desirable to use the salt in an amount of 0.5 to 25 percent by weight, preferably 1.4 to 20 percent by weight, based on the combined weight of the aforementioned three components.

A raw material having the components mixed at a ratio satisfying the requirement described above is blended and then converted into a slurry by addition of water. The manufacture of the foam glass from this slurry is accomplished by either of the following two processes. One process pressure forming the steps of drying the slurry by a known method, then pulverizing the dried slurry to obtain a powdered mixture and subsequently compression molding the powdered mixture. This compression molding serves the purpose of accelerating the formation of uniform fine bubbles in the subsequent step of firing. When the convenience of handling of the molded article is also taken into account, the pressure applied for the purpose of this pressure forming proves suitable beyond the level of 10 kg/cm$^2$. Then, the molded mixture is fired. The other process comprises the steps of casting the slurry in a mold, drying the mold and then firing the molded mixture. This firing converts the molded mixture into a fused state and, at the same time, causes formation of countless bubbles in the fused mixture. If SHIRASU, which is typical of volcanic glass materials, was heated by itself, the firing effected at 1000°C would barely convert it into a brown powder. When SHIRASU is contained in the mixture in conjunction with silicate glass and water glass as described above, however, the heating and firing converts the whole mixture into a fused state. The firing is desired to be carried out at 850° – 950°C. Although foam glass of sufficiently advantageous properties is obtained at a higher temperature, any product obtained at a temperature lower than 850°C exhibits too inferior water-resistance for the product to be practical. When a mixture consisting of the three components but lacking the salt of phosphoric acid is fired, the formation of bubbles occurs only to a limited extent and the product is obtained in a sintered state, giving an impression that the firing has been insufficient. Addition of the salt, therefore, is indispensable for the ample inclusion of bubbles in the product. If the amount of the salt is smaller than the lower limit of the aforementioned range, the time stability of the diameter of bubbles falls short of the standard. If it exceeds the upper limit of the range, there is a disadvantage that the bulk density increases, the vitrification terminates immaturely, the percentage of closed bubbles decreases and that of open bubbles increases and the water-resistance is consequently degraded. The temperature stability of the diameter of bubbles is also lower than is required. Take, for example, a mixture consisting of 34 percent by weight of silicate glass, 34 percent by weight of SHIRASU and 32 percent by weight of water glass, representing a mixing ratio which falls inside the aforementioned desirable range. Then, dibasic sodium phosphate, dibasic calcium phosphate and calcium sulfate are added to the mixture in amounts of 4 percent by weight, 2.8 percent by weight and 2.8 percent by weight respectively. The resultant mixtures are fired for 5 minutes at varying temperatures between 800° and 1000°C. The mixture omitting the addition of the salt is also treated similarly. When the fired products are compared in terms of ratio of increase in diameter of bubbles in the temperature zone of from 800° to 950°C, it is found that the ratio of increase is about 600 percent in the case of the mixture excluding the salt and the mixture incorporating calcium sulfate, about 400 percent in the case of the mixture incorporating dibasic calcium phosphate and about 200 percent in the case of the mixture incorporating dibasic sodium phosphate respectively. This comparison clearly indicates that the temperature stability of the diameter of bubbles is enhanced by the addition of the specified salt of phosphoric acid. Further, the incorporation of the salt also results in improvement in the time stability of the diameter of bubbles as shown below. When the mixture of the same composition as mentioned above is fired for 5 minutes and 80 minutes at 900°C, for example, the ratio of increase in the diameter of bubbles is 230 percent in the case of the mixture excluding the addition of salt, 440 percent in the case of the mixture incorporating calcium sulfate, 150 percent in the case of the mixture incorporating dibasic calcium phosphate and 130 percent in the case of the mixture containing dibasic sodium phosphate respectively. Solid foam glass aimed at is obtained by cooling the fused mold. The term "volcanic glass materials" used in the present specification refers to "glassy rocks" which being typified by perlite and obsidian are composed of 65 – 75 percent of $SiO_2$, 12 – 15% of $Al_2O_3$, 3 – 8% of $CaO + MgO$, and have 0.1 – 7 percent in ignition loss and 15 percent of crystal impurities, and to "volcanic ashes" which being typified by SHIRASU are composed of 65 – 73 percent of $SiO_2$, 12 – 18 percent of $Al_2O_3$, 5 – 7 percent of $Na_2O + K_2O$, about 2.5 percent of $CaO + MgO$, 1 – 3 percent of $FeO + Fe_2O_3$ and have 2.5 – 2.9 percent in ignition loss.

Now that the method of the present invention has been described, it should be noted that the raw material to be used in this method is quite inexpensive, the method itself is easy to carry out and the range of mixing ratio of the components in the raw material is large. Because of these advantages, the method is quite suitable for mass production.

Ordinary foam glass, when fired, expands to 7 to 10 times its original volume. Therefore, it is difficult to produce this foam glass directly in a small thickness. In contrast, the foam glass of the present invention expands to only 1.5 to 3 times its original volume and, therefore, can be obtained directly in the form of this sheets. Thus, the method of this invention is highly suitable as a commercial process for the manufacture of foam glass. The foam glass obtained by the method of this invention is beautiful, and has excellent mechanical strength such as high bending strength. It has a chemical composition of 72.2 to 74.7 percent of $SiO_2$, 2.6 to 9.8 percent of $Al_2O_3$, 9.3 to 14.9 percent of $Na_2O$, 15 to 2.2 percent of $K_2O$, about 0.6 percent of $Fe_2O_3$, 0.1 to 6.5 percent of $CaO$ and 0 to 1.9 percent of $MgO$ by weight ratio. The bulk density is less than 1 and the diameter of its fine bubbles is less than 1.5mm. The foam glass enjoys properties excelling those of the conventionally known foam glass. It is suitable for use in interior and exterior decorative article for buildings. The unusual beautifulness characterizes the foam glass of this invention.

The effect of this invention will be demonstrated by the preferred embodiments to be cited herein below. It should be understood that the present invention is not limited by these examples.

EXAMPLE 1

A mixture consisting of 93g of cullet, 9.2cc of water glass No. 3 of Japanese Standard (5g of anhydride equivalent), 2g of SHIRASU and 4.1g of dibasic sodium phosphate (12-hydrate) was converted into a slurry by addition of 20cc of water. The slurry was dried, pulverized, formed, heated in an electric furnace up to 900°C at a rate of temperature increase of 150°C per hour, held at the top temperature for 5 minutes, then allowed to cool off within the furnace. Consequently, there was obtained a formed glass having a bulk density of 0.4, a foam average diameter of 1.5mm and a bending strength of 15 $kg/cm^2$. The water glass No. 3 used in this case was of a type having a specific gravity of more than 40°Be at 20°C and containing 28 to 30 percent by weight of $SiO_2$ and 9 to 10 percent of $Na_2O$.

EXAMPLE 2

A mixture consisting of 65g of cullet, 30g of SHIRASU, 9.2cc of water glass No. 3 and 4.1g of dibasic sodium phosphate was converted into a slurry by addition of water. The slurry was cast in a wooden mold (with a polyethylene fabric used as a mold release), dried at 80° to 95°C for 24 to 48 hours, heated in an electric furnace to 950°C at a rate of temperature increase of 200°C per hour, kept at 950°C for 20 minutes and then left to cool off in the furnace. Consequently, a foamed glass was obtained having a bulk density of 0.83, an average bubble diameter of 1.0mm and bending strength of 46 $kg/cm^2$.

EXAMPLE 3

A mixture consisting of 52.5g of cullet, 22.5g of SHIRASU, 46cc of water glass No. 3 and 4.1g of dibasic sodium phosphate was converted into a slurry by addition of water. The slurry was treated in the same way as in Example 1 to afford foam glass having a bulk density of 0.52, an average bubble diameter of 0.9mm and bending strength of 24 $kg/cm^2$.

EXAMPLE 4

A mixture of 60g of cullet, 30g of SHIRASU, 18.5cc of water glass and 4.1g of dibasic sodium phosphate was converted into a slurry by addition of water. The slurry was treated in the same way as in Example 2 to afford foam glass having a bulk density of 0.53, an average bubble diameter of 1.1mm and bending strength of 24 $kg/cm^2$.

EXAMPLE 5

A mixture consisting of 35g of cullet, 35g of SHIRASU, 56cc of water glass No. 3 and 4.1g of dibasic sodium phosphate was converted into a slurry by addition of water. The slurry was treated in the same way as in Example 2 and then fired at 900°C for 80 minutes to afford foam glass having a bulk density of 0.61, an average bubble diameter of 1.0mm and bending strength of 22 $kg/cm^2$.

EXAMPLE 6

A mixture was formed of 27.6g of cullet, 27.6g of SHIRASU, 46cc of water glass No. 3 and 20g of dibasic sodium phosphate and converted into a slurry by addition of water. The slurry was treated in the same way as in Example 2 to afford foam glass having a bulk density of 0.90, an average bubble diameter of 0.56mm and bending strength of 61 $kg/cm^2$.

EXAMPLE 7

A mixture consisting of 42.5g of cullet, 42.5g of SHIRASU, 28cc of water glass No. 3 and 4.1g of dibasic sodium phosphate was converted into a slurry by addition of water. The slurry was treated in the same way as in Example 2 to afford foam glass having an average bubble diameter of 0.8mm, a bulk density of 0.72 and bending strength of 38 $kg/cm^2$.

EXAMPLE 8

A mixture consisting of 55g of cullet, 40g of SHIRASU, 9.2cc of water glass No. 3 and 4.1g of dibasic sodium phosphate was converted into a slurry by addition of water. The slurry was treated in the same way as in Example 2 to afford foam glass having a bulk density of 1.2, an average bubble diameter of 0.6mm and bending strength of 107 $kg/cm^2$.

EXAMPLE 9

A mixture consisting of 75g of cullet, 20g of SHIRASU, 9.2cc of water glass No. 3 and 4.1g of dibasic sodium phosphate was converted into a slurry by addition of water. The slurry was treated in the same way as in Example 2 to afford foam glass having a bulk density of 0.59, an average bubble diameter of 0.9mm and bending strength of 20 kg/cm$^2$.

EXAMPLE 10

A mixture consisting of 30g of cullet, 40g of SHIRASU, 56cc of water glass No. 3 and 2.8g of dibasic calcium phosphate was converted into a slurry by addition of water. The slurry was treated in the same way as in Example 2 to afford foam glass having a bulk density of 0.9, an average bubble diameter of 0.8mm and bending strength of 50 kg/cm$^2$.

EXAMPLE 11

A mixture consisting of 45g of cullet, 30g of SHIRASU, 46cc of water glass No. 3 and 2.8g of dibasic calcium phosphate was converted into a slurry by addition of water. The slurry was treated in the same way as in Example 2 to afford foam glass having a bulk density of 0.7, an average bubble diameter of 1.2mm and bending strength of 35 kg/cm$^2$.

EXAMPLE 12

A mixture consisting of 60g of cullet, 20g of SHIRASU, 37cc of water glass No. 3 and 2.8g of dibasic calcium phosphate was converted into a slurry by addition of water. The slurry was treated in the same way as in Example 2 to afford foam glasss having a bulk density of 0.76, an average bubble diameter of 1.5mm and bending strength of 48 kg/cm$^2$.

EXAMPLE 13

A mixture consisting of 35g of cullet, 35g of SHIRASU, 56cc of water glass No. 3 and 2.8g of dibasic calcium phosphate was converted into a slurry by addition of water. The slurry was treated in the same way as in Example 2 to afford foam glass having a bulk density of 0.76, an average bubble diameter of 1.5mm and bending strength of 48 kg/cm$^2$.

EXAMPLE 14

A mixture consisting of 33.6g of cullet, 33.6g of SHIRASU, 40cc of water glass No. 3 and 4.1g of dibasic sodium phosphate was converted into a slurry by addition of water. The slurry was treated in the same way as in Example 2 to afford foam glass having a bulk density of 0.57, an average bubble diameter of 0.7mm and bending strength of 40 kg/cm$^2$.

What is claimed is:

1. A method for the manufacture of foam glass, which comprises the steps of:

mixing silicate glass, SHIRASU, which is a white-colored volcanic ash sand occurring abundantly in Japan, having as its principal component, volcanic glass, and also containing crystals of feldspar, and having as principal chemical constituents $SiO_2$, $Al_2O_3$, NaO and $K_2O$, and possessing a particle size distribution of 2–0.05 mm, a specific gravity of 2.4 – 1.8 and a softening point of 1200°C, water glass and at least one salt selected from the group consisting of 0.5 to 25 percent by weight of a sodium salt of phosphoric acid and 0.3 to 15 percent by weight of a calcium salt of phosphoric acid, wherein the amount of said salt is based on the total combined weight of silicate glass, SHIRASU and water glass, so that the mixing ratio of said silicate glass, SHIRASU and water glass falls within the area of a ternary diagram of silicate glass, SHIRASU and water glass defined by the sequentially connected points of P-T-S-R-Q, wherein the point P is 1 percent by weight silicate glass, 69 percent by weight SHIRASU and 30 percent by weight water glass, the point T is 65 percent by weight silicate glass, 30 percent by weight SHIRASU and 5 percent by weight water glass, the point S is 93 percent by weight silicate glass, 2 percent by weight SHIRASU and 5 percent by weight water glass, the point R is 50 percent by weight silicate glass, 20 percent by weight SHIRASU and 30 percent by weight water glass, and the point Q is 1 percent by weight silicate glass, 50 percent by weight SHIRASU and 49 percent by weight water glass;

converting the resultant mixture into a slurry by the addition of water;

drying and pulverizing said slurry;

pressure-fabricating the pulverized mixture;

firing the fabricated mixture at a temperature of 850° – 950°C into a fused state; and cooling the fused mixture.

2. The method of claim 1, wherein said sodium phosphate salt is dibasic sodium phosphate and said calcium phosphate salt is dibasic calcium phosphate.

3. A method for the manufacture of foam glass, which comprises the steps of:

mixing silicate glass, SHIRASU, which is a white colored volcanic ash sand occurring abundantly in Japan, having as its principle component, volcanic glass and also containing crystals of feldspar, and having as principle chemical constituents $SiO_2$, $Al_2O_3$, NaO and $K_2O$, and possessing a particle size distribution of 2–0.05 mm, a specific gravity of 2.4 – 1.8 and a softening point of 1200°C, water glass and at least one salt selected from the group consisting of 0.5 to 25 percent by weight of a sodium salt of phosphoric acid and 0.3 to 15 percent by weight of a calcium salt of phosphoric acid, wherein the amount of said salt is based on the total combined weight of silicate glass, SHIRASU and water glass, so that the mixing ratio of said silicate glass, SHIRASU and water glass falls within the area of a ternary diagram of silicate glass, SHIRASU and water glass defined by the sequentially connected points of P-T-S-R-Q, wherein the point P is 1 percent by weight silicate glass, 69 percent by weight SHIRASU and 30 percent by weight water glass, point T is 65 percent by weight silicate glass, 30 percent by weight SHIRASU and 5 percent by weight water glass, S is 93 percent by weight silicate glass, 2 percent by weight SHIRASU and 5 percent by weight water glass, R is 50 percent by weight silicate glass, 20 percent by weight SHIRASU and 30 percent by weight water glass, and point Q is 1 percent by weight silicate glass, 50 percent by weight SHIRASU and 49 percent by weight water glass;

converting the resultant mixture into a slurry by addition of water, then casting the slurry in a mold;

drying the slurry to obtain a molded mixture;

firing the molded mixture at a temperature of 850° – 950°C into a fused state; and
cooling the fused mixture.

4. The method of claim 3, wherein said sodium phosphate salt is dibasic sodium phosphate and said calcium phosphate salt is dibasic calcium phosphate.

* * * * *

UNITED STATES PATENT AND TRADEMARK OFFICE
CERTIFICATE OF CORRECTION

PATENT NO. : 3,951,632
DATED : April 20, 1976
INVENTOR(S) : Yachiho Seki and Masaya Nakamura It is certified that error appears in the above—identified patent and that said Letters Patent are hereby corrected as shown below:

Section [75], Line 1, change "Yachio Seki" to --Yachiho Seki--.

*Signed and Sealed this*

*twenty-ninth* Day of *June 1976*

[SEAL]

Attest:

RUTH C. MASON
*Attesting Officer*

C. MARSHALL DANN
*Commissioner of Patents and Trademarks*